US008995389B2

(12) United States Patent
Larsson et al.

(10) Patent No.: US 8,995,389 B2
(45) Date of Patent: Mar. 31, 2015

(54) POLICY MANAGEMENT IN MULTI-ACCESS SCENARIOS

(75) Inventors: Tony Larsson, Upplands Väsby (SE); Tor Kvernik, Täby (SE); Mattias Lidström, Stockholm (SE); Belen Pancorbo Marcos, Madrid (ES); Justus Petersson, Stockholm (SE); Henrik Basilier, Täby (SE); Victor Manuel Avila Gonzalez, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1731 days.

(21) Appl. No.: 12/307,397

(22) PCT Filed: Dec. 28, 2006

(86) PCT No.: PCT/SE2006/050630
§ 371 (c)(1),
(2), (4) Date: Feb. 23, 2010

(87) PCT Pub. No.: WO2008/004928
PCT Pub. Date: Jan. 10, 2008

(65) Prior Publication Data
US 2010/0135243 A1    Jun. 3, 2010

(30) Foreign Application Priority Data
Jul. 5, 2006    (SE) .................................... 0601494

(51) Int. Cl.
*H04W 8/20* (2009.01)
*H04W 36/00* (2009.01)

(52) U.S. Cl.
CPC ............ *H04W 8/20* (2013.01); *H04W 36/0044* (2013.01)

USPC .................. 370/331; 455/432.1; 455/436

(58) Field of Classification Search
USPC ............ 370/310.2, 328–339, 349; 455/422.1, 455/432.1, 432.2, 432.3, 433, 436–444
See application file for complete search history.

(56) References Cited

U.S. PATENT DOCUMENTS

| | | | |
|---|---|---|---|
| 7,027,818 B2 * | 4/2006 | Bos et al. ................... | 455/452.2 |
| 7,773,571 B1 * | 8/2010 | Maxwell et al. .............. | 370/338 |
| 2003/0023880 A1 * | 1/2003 | Edwards et al. .............. | 713/201 |
| 2005/0091409 A1 * | 4/2005 | Williams et al. .............. | 709/247 |
| 2006/0064478 A1 * | 3/2006 | Sirkin .......................... | 709/223 |
| 2007/0066286 A1 * | 3/2007 | Hurtta ........................ | 455/414.1 |
| 2007/0162599 A1 * | 7/2007 | Nguyen ........................ | 709/225 |
| 2008/0176560 A1 * | 7/2008 | Dutta et al. ................... | 455/433 |
| 2008/0229385 A1 * | 9/2008 | Feder et al. ...................... | 726/1 |

FOREIGN PATENT DOCUMENTS

| | | | | |
|---|---|---|---|---|
| WO | WO 03/085901 A1 * | 10/2003 | ............. | H04L 12/56 |
| WO | WO 2006/108436 A1 * | 10/2006 | ............. | H04L 12/24 |

* cited by examiner

*Primary Examiner* — Hoon J Chung

(57) ABSTRACT

The invention comprises methods and arrangements for Policy Decision Point discovery in a roaming or handover scenario in an IP network (IN) comprising a plurality of network elements. The invention introduces a Re-direct Policy Decision (RPDF) Function which can deliver addresses to PDPs associated to a certain Mobile Terminal. The RPDF comprises a memory for storing addresses (AP-DPA, SPDPA1) of Policy Decision Points and Mobile Terminals. The RPDF makes it possible for a network element, e.g. an application function, a policy enforcement point or another policy decision point, to find a Policy Decision Point associated to the Mobile Terminal.

30 Claims, 4 Drawing Sheets

POLICY MANAGEMENT IN MULTI-ACCESS SCENARIOS

TECHNICAL FIELD

The present invention relates to policy management in an IP network. In more detail it relates to policy management in the case of roaming and handover between two Policy Enforcement Points controlled by two different Policy Decision Points.

BACKGROUND

Policy management in an IP network is an important function as the policies indicate essential conditions for the users in the network.

An example of an IP network is IP Multimedia Subsystem (IMS). IMS has been developed by the $3^{rd}$ Generation Partnership Project (3GPP) as an open standard, to give operators of access networks the ability to offer multimedia services in the packet domain. An IMS network can be built above any type of access network and is more or less independent of the access technology used. By using IMS, telecommunications operators can provide services to users irrespective of their location, access technology, and terminal. It also includes a handover of calls between fixed-line and mobile networks.

An important function of IP networks is the enforcement of different policies. These policies dictate e.g. what particular users may and may not do, what they will be charged or what Quality of Service (QoS) a particular user will receive for a specific service. Policies are enforced using policy "rules". A single policy may require a set of policy rules. Policy rules are installed into a node through which all traffic of the users pass or into multiple nodes, which collectively handle all traffic of the user. Common functions in a policy management system are a Policy Enforcement Point (PEP), a Policy Decision Point (PDP) and a subscriber database comprising subscriber/subscription related information.

In 3GPP the PDP functions are handled by the Policy and charging Rules Function (PCRF), the PEP functions are handled by the PCEF located in the GGSN and the subscriber database functions are handled by the Subscription Profile Repository (SPR).

For large IP networks it is common to have several PEPs and several PDPs. Each operator has normally at least one subscriber database for their users. An important function in a case of an IP network is the possibility of roaming and handover between different access points and access networks. Roaming occurs when a user of one service provider or operator uses the facilities of another service provider or operator. Handover normally means the transfer of an ongoing call or data session from one channel connected to the network to another.

From a policy management point of view a Mobile Terminal access the IP network via a PEP which is associated to a specific PDP, which controls the PEP and the terminal.

For e.g. reasons of scalability, each operator could have several PDP in his network. It is also possible that an operator has a specific PDP for a certain access, e.g. one PDP for 3GPP access and another one for WiMAx access. If a visited network or a home network comprises several PDPs there is no solution today that can handle the policy management in roaming and handover between different PEPs.

In 3GPP R7 a mobile terminal accesses the IP network via a PCEF, a PEP, and the mobile terminal will be associated to a PCRF, a PDP, which controls to the PCEF and the terminal. If the IP Connectivity Access Network (IP-CAN) is GPRS the appropriate PCRF could be contacted based on which Access Point Name (APN) the mobile terminal is connected to. It is also possible to use the IP address or the user equipment identity to choose the appropriate PCRF.

For other IP-CANs the Gateway shall contact the appropriate PCRF based on the access point the mobile terminal is connected to and, optionally, a mobile terminal identity information that is applicable for that IP-CAN. In the case of GPRS the mapping from a certain user equipment identity and/or access point name to the PCRF is typically stored in pre-configured tables in the GGSN, the PCEF and the P-CSCF, the AF.

If there is a plurality of PCRFs in a network the policy management will not work properly. If the mobile terminal has the possibility to access the network via different access points and access networks controlled by different PDPs, different nodes associated to the mobile terminal does not know which PDP that controls the policy management of a mobile terminal.

Other architectures have similar functions as the PCRF, e.g. TISPAN, WiMax Forum, DSL Forum and PacketCable. They also have similar solutions to associate a mobile terminal to a specific PDP.

SUMMARY

To make it possible for the policy management to work in an IP network comprising a plurality of Policy Decision Points (PDP) the network needs to set up connection between some of the policy management functions.

The invention solves this problem by introducing a Redirect Policy Decision Function RPDF which can deliver addresses of PDPs associated to a certain Mobile Terminal. The RPDF comprises a memory for storing addresses (APDPA, SPDPA1) of Policy Decision Points and Mobile Terminals. The RPDF makes it possible for a network element, e.g. an Application Function, a policy enforcement point or another policy decision point, to find a Policy Decision Point associated to the Mobile Terminal.

A network element, e.g. a PDP, that needs to know the address of a PDP associated to a mobile terminal sends a request to the RPDF and retrieves the address. The address can then be used to set up a connection between the two PDPs and transfer policy information related to a Mobile Terminal. This is necessary for the policy management function to work properly in a network comprising a plurality of PDPs.

A PDP could update the RPDF when it gets associated to a mobile phone. The RPDF could be situated in the home operator network of the Mobile Terminal or in a visited operator network.

An object of the invention is that the algorithm used to select PDP and Application Function could be stored in one place. This algorithm is typically stored in the Policy Enforcements Points and the Application Functions. According to one aspect of the invention it can be stored in one place only, i.e. in the RPDF.

Another object of the invention concerns the addresses of the RPDFs. There is one RPDP in each operator network. If the operator network where the PDP associated to a mobile terminal is known, it will possible to find the address of the RPDF. All PDPs need to be able to get the addresses of all RPDP in the network to be able to request the address of a PDP associated to the terminal.

An advantage with this invention is that it makes it possible to support handover and roaming scenarios between Policy Enforcement Points in a network comprising a plurality of Policy Decision Points. The invention provides a discovery and selection mechanisms of a PDP that is applicable to all kind of nodes in the network, e.g. a PEP, the Application Function or another Policy Decision Point.

Another advantage is that it is possible to store the actual selection algorithm for a PDP in one place, i.e. in the Re-direct PDP Function, instead of multiple place, e.g. in all GGSN nodes and all Application Function nodes.

The invention will now be described more in detail with the aid of preferred embodiments in connection with the enclosed drawings.

DETAILED DESCRIPTION

Figure 1:
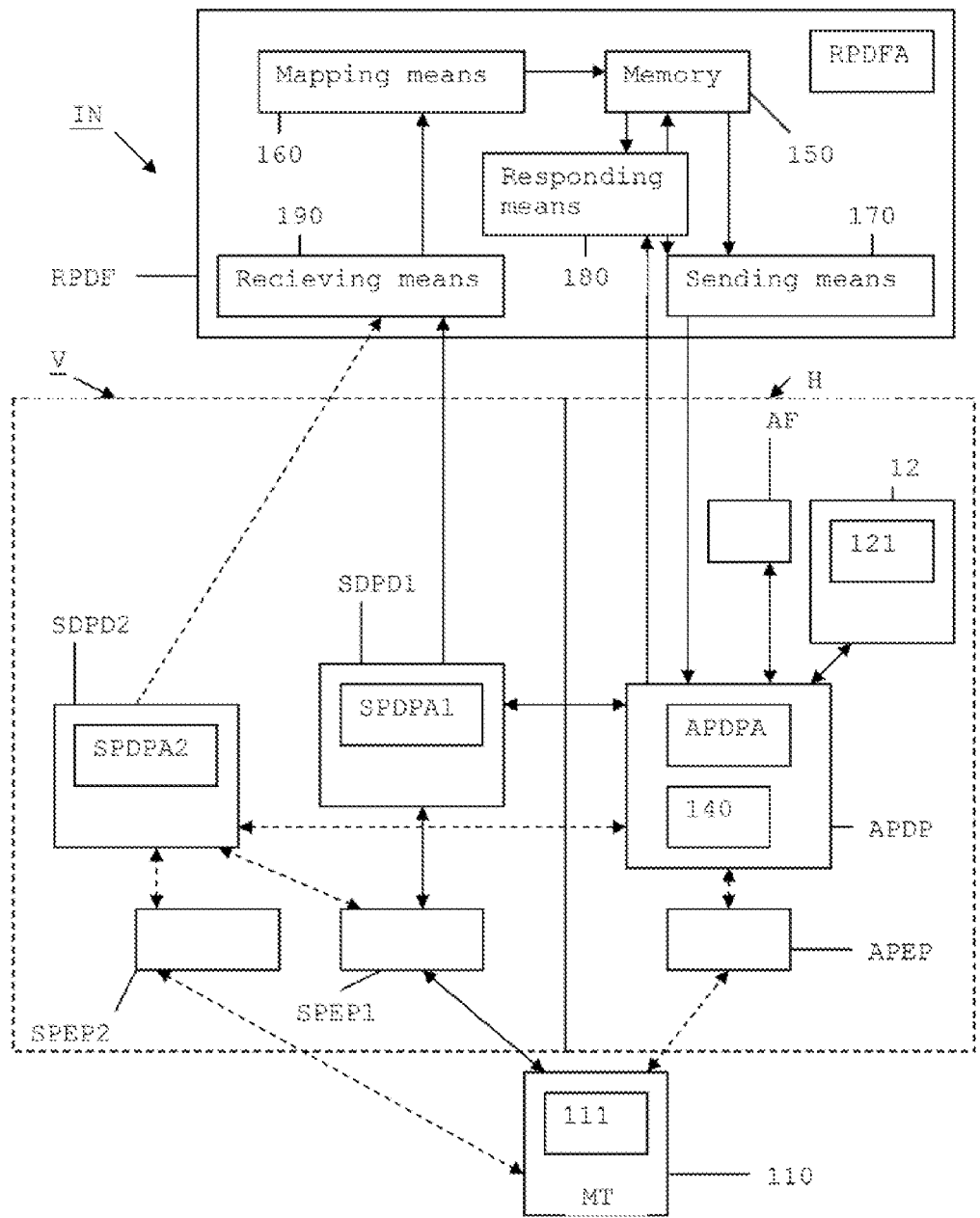
FIGS. 1 and 2 are block diagrams to illustrate different embodiments of the invention

FIG. 1 illustrates an IP network IN comprising a Mobile Terminal 110, a Database 120 comprising policy related subscriber data 121, policy rules 140, an. Anchor Policy Decision Point APDP, two Serving Policy Decision Points SPDPI and SPDP2, an Anchor Policy Enforcement Point APEP, two Serving Policy Enforcement Points SPEP1, SPEP2, an application function AF and a Redirect Policy Decision Point Function RPDF. The serving functions are in this case situated in a visited network V and the Anchor functions are situated in a home network H. The addresses of the Policy Decision Points and the RPDP are APDPA, SPDPA1 SPDPA2 and RPDFA. The Mobile Terminal 110 has an address 111.

A Policy Enforcement Point (PEP) is a function that requests for access to a resource or execution of a service. The PEP requests evaluation of these access/service execution requests to a Policy Decision Point (PDP). The PDP returns its decision to the PEP and the PEP enforces/carries out the decision that is returned by the PDP. The PEP could e.g. block certain types of traffic according to the decision of the PDP or grant access to specific services.

The main task of a Policy Decision Point (PDP) is to evaluate requests addressed to the PEP. It evaluates the request against a policy. The outcome of the policy evaluation is the 'decision' of the PDP. The PDP and the PEP may be implemented as two distinct entities that intercommunicate by means of a protocol. The protocol between PEP and PDP depends on implementation, it may be a local method call, it may be based on RMI, COPS, Radius, Diameter, a Web Service that carries an XACML object etcetera.

An example of a PEP and the PDP is the Policy and Charging Rules Enforcement Function (PCEF) and the Policy and Charging Rules Function (PCRF) in 3GPP R7. Critical traffic, e.g. voice, will be controlled by the PCRF.

An Anchor PDP controls the Mobile Terminal from a policy management point of view and has access to Policy Rules PR and specific policy information for the Mobile Terminal, the Policy related Subscriber Data PSD. A Serving PDP is the one that controls the PEP that the mobile terminal is connected to. These PDPs could be situated everywhere in the network, e.g. in the access network, core network or service network.

In a first embodiment the Anchor PDP is situated in the Home operator network and the Serving PDP is situated in a visited network. The Anchor PDP is also connected to an Application Function (AF). The AF is situated in the Home network H.

The Policy Rules 140 could be stored everywhere, e.g. in the different PDPs or in a separate policy database. In this particular embodiment they are stored in the Anchor PDP.

Policy related subscriber data 121, e.g. subscriber class or subscriber services, for a particular user/subscriber 110 are stored in the database (DB) 120. This database is located in the Home network H. Protocol used between the DB and a PDP could be e.g. LDAP. An example of a DB is the Subscription Profile Repository in 3GPP R7.

The Application Function AF is an element offering applications that require the control of IP bearer resources. The Application Function is capable of communicating with the PDP to transfer dynamic service information, which can then be used for selecting the appropriate charging rule and service based local policy by the PDP. One example of an Application Function is the P-CSCF of the IM CN subsystem.

If a mobile user accesses the network via another PEP than the Anchor PEP, e.g. a Serving PEP, SPEP1 in a visiting network, the user is going to be associated to Serving PDP SPDP1, that controls the Serving PEP, SPEP1. If he access via another Serving PEP, SPEP2, he is going to be associated to another Serving PDP, SPDP2. In this example he attaches to SPEP1 and SPDP1.

To be able to enforce the proper policy decisions the SPDP1 and the APDP must communicate with each other. This could be done via the interface S9 mentioned in 3GPP TS 23.203 and TR 23.882. To be able to set up a connection the invention proposes that one of the Policy Decision Points, SPDP1 or APDP, receives the address of the other one. To be able to do this, the invention introduces a Re-direct PDP function RPDF.

The RPDF comprises receiving means 190 for receiving addresses of network elements and a memory 150 for storing those addresses. The RPDF also comprises mapping means 160 for mapping and store the address or identity of a mobile terminal on an address of a PDP (the Anchor PDP or the serving PDP) associated to the Mobile Terminal. The RPDF further comprises sending means 170 for sending an address to a network element and responding means 180 for doing so upon a request. A network element, e.g. a PDP, that needs to know the address of a PDP associated to a mobile terminal can send a request to the RPDF and retrieve the address. The address can then be used to set up a connection between the two PDPs. This is necessary for the policy management function to work properly in a network comprising a plurality of PDPs.

The algorithm used to select Anchor PDP and AF is typically stored in the PEPs and the AFs. It could be stored in one place only, in the RPDF. In an embodiment where the address of the Anchor PDP is registered at the RDPF there is not necessary for the Anchor PDP to update the RPDF, the RPDF already has this information.

In a first embodiment of the invention the RPDF maps the address 111 of the Mobile Terminal on the address SPDPA1 of the Serving PDP. This mapping is updated every time the Mobile Terminal makes a new attachment to a PEP in the network. If for example the user accesses via SPEP2 and SPDP2 the address 111 of the mobile terminal 110 is mapped on SPDPA2. The APDP could then query the RPDF for the address of the serving PDP, SPDPA1, SPDPA2 etc, that currently controls the PEP associated to the mobile terminal. The RPDP can be situated in the home network or in the visited network.

If the Anchor PDP, APDP, needs to set up a communication with SPDP1 it must get the address RPDFA of the RPDF that has the mapping of the address 111 of the mobile terminal and the address of the Serving POP SPDPA1.

To be able to find a proper RPDF, there will be one unique RPDF for each operator network. All PDPs in the network need to know the addresses of all RPDP in the network to be able to request the address of the PDP where the mobile terminal is currently attached. The invention suggests two alternatives for this.

A first alternative is that all PDPs have a table with the address to all RPDF of network operators that the operator of the home network has a roaming agreement with.

A second alternative is that the PDPs dynamically find out the address to the correct RPDP by using DNS queries. The DNS query mechanism is used by introducing a standardized DNS name for each network operators RPDF. This can be in the form of "re-direct-pdp.operatorname.com", where "operatorname" changed to the operator in question e.g. Vodafone, TeliaSonera etc. The IP address to the re-direct PDP is found by doing a DNS query for re-direct-pdp.operatorname.com".

The name of a network operator can be retrieved from the IMSI if a SIM card exists or via some sort of reverse DNS query on the terminals Mobile IP home address.

Figure 3:
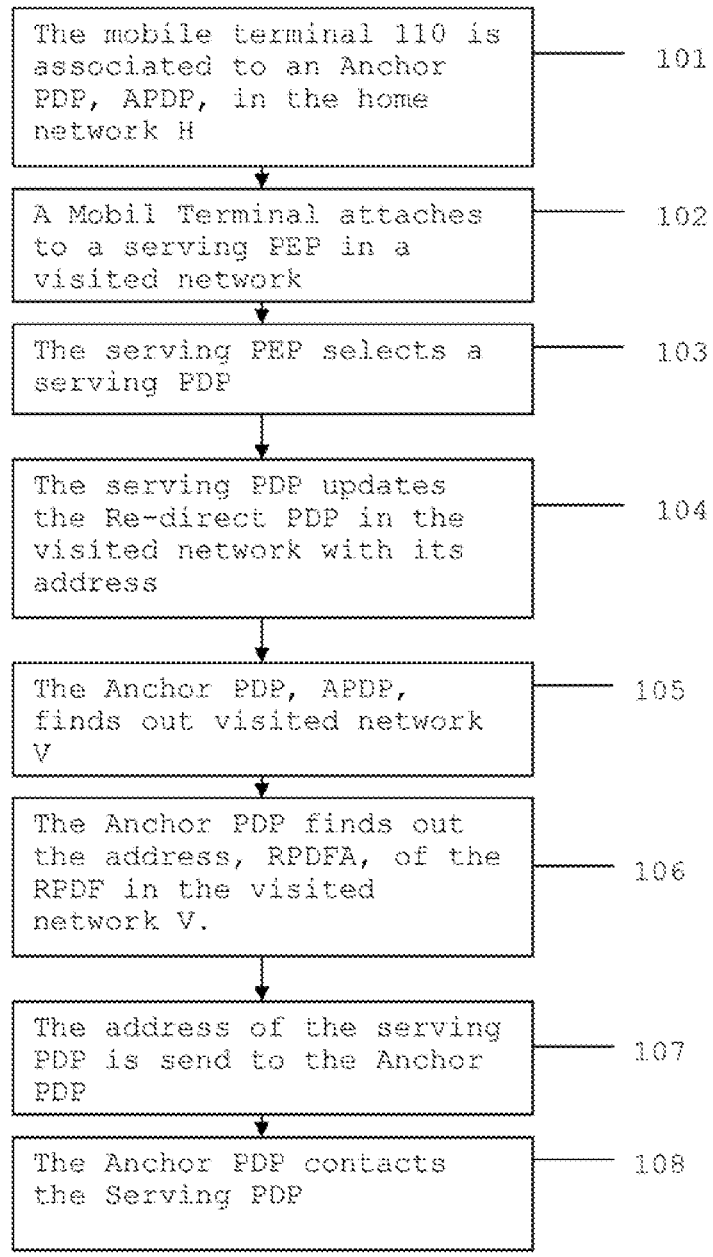
FIGS. 3 and 4 are flowcharts illustrating method steps in different embodiments of the invention

In FIG. 3 a method in a first embodiment is described. In this case the RPDF is situated in the visited network V and the address of the mobile terminal 111 is mapped on the address SPDPA1 of the serving PDP.

- The mobile terminal 110 is associated to an Anchor PDP, APDP, in the home network H of the mobile terminal. This is illustrated in block 101 of FIG. 3.
- The mobile terminal attaches to a serving PEP, SPEP1, in a visited network V. This is illustrated in block 102 of FIG. 3.
- The serving PEP SPEP1 selects a serving PDP, SPDP1, based on some algorithm. This is illustrated in block 103 of FIG. 3.
- The serving PDP, SPDP1 contacts the RPDF in the visited network V and updates it with the mapping of the address 111 of the mobile terminal and the address SPDPA1, of the Serving PDP1. This is illustrated in block 104 of FIG. 3.
- The Anchor PDP, APDP, finds out which visited network V the mobile terminal is attached to. This information is e.g. retrieved during the authentication and registration phase of the Mobile Terminal. This is illustrated in block 105 of FIG. 3.
- The Anchor PDP finds out the address, RPDFA, of the RPDF in the visited network V. This could be done by e.g. using a re-direct table or DNS query. This is illustrated in block 106 of FIG. 3.
- The Anchor PDP contacts RPDF in the visited network and retrieves the address, SPDPA1, of the Serving PDP, SPDP1, associated to the mobile terminal. This is illustrated in block 107 of FIG. 3.
- The Anchor PDP contacts Serving PDP, SPDP1, using the address SPDPA1 of the Serving PDP, SPDP1. This is illustrated in block 108 of FIG. 3.

An alternative method of the first embodiment is described below. The RPDF is situated in the home network H of the mobile terminal and the address of the mobile terminal 111 is mapped on the address APDPA of the Anchor PDP.

- The mobile terminal is associated to an Anchor PDP, APDP, in the home network H of the mobile terminal.
- The address 111 of the mobile terminal is mapped on the address, APDPA, of the Anchor PDP. This information is stored in the redirect PDP function, RPDF.
- The mobile terminal attaches to a serving PEP, SPEP1, in a visited network V.
- The serving PEP, SPEP1, selects a serving PDP, SPDP1, based on some algorithm.
- The serving PDP, SPDP1 finds out the home network H of the mobile terminal 110. The name of a network operator can e.g. be retrieved from the IMSI if a SIM card exists or via some sort of reverse DNS query on the terminals Mobile IP home address.
- The serving PDP, SPDP1 finds out the address, RPDFA, of the RPDF in the home network H. This could be done by e.g. using a re-direct table or DNS query.
- The serving PDP, SPDP1, contacts RPDF in the home network and retrieves the address, APDPA, of the anchor PDP, APDP, associated to the mobile terminal.
- The serving PDP, SPDP1 contacts the Anchor PDP using the address APDPA of the anchor PDP.

It is also possible to have the RPDF situated in the visited network and let it map the address of the mobile terminal on the address of the anchor PDP. The serving PDP could then to contact the RPDF to retrieve the address of the Anchor PDP. Another solution is to have the RPDF situated in the Home network and let it map the address of the mobile terminal on the address of the serving PDP. It is then the Anchor PDP that contacts the RPDF to retrieve the address of the Serving PDP.

Figure 2:
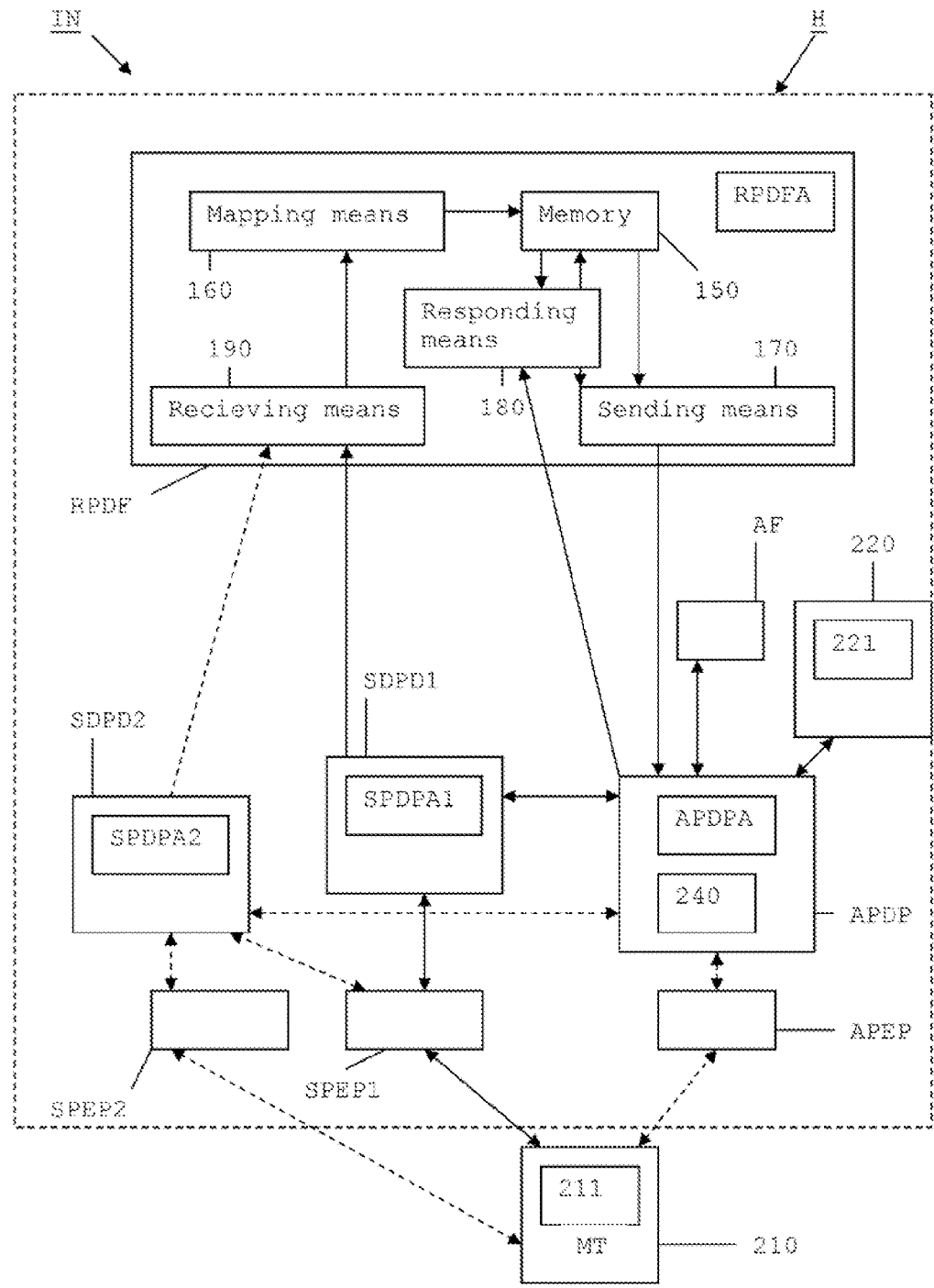

FIG. 2 illustrates an IP network comprising a Mobile Terminal 210, a Database 220 comprising policy related subscriber data 221, policy rules 240, an Anchor Policy Decision Point APDP, two Serving Policy Decision Points SPDP1, SPDP2, an Anchor Policy Enforcement Point APEP, two Serving Policy Enforcement Points SPEP1, SPEP2, an application function AF and a Redirect Policy Decision Point Function RPDF. The Anchor and the serving functions are in this case situated in the home network H. The addresses of the Policy Decision Points and the RPDP are APDPA, SPDPA1, SPDPA2 and RPDFA. The Mobile Terminal 210 has the address 211.

In a second embodiment of the invention, a handover scenario, the RPDF maps the address 211 of the Mobile Terminal 210 on the address SPDPA1 of the serving PDP, SPDP1. This mapping is updated every time a terminal makes a new attachment to a PEP in the network. The Anchor PDP could then query the RPDF for the address of the serving PDP that currently controls the mobile terminal. The RPDP is situated in the home network H.

A method in the second embodiment. RPDF is situated in the home network. The address of the mobile terminal 211 is mapped on the address of the serving PDP, SPDPA1.

- The mobile terminal is associated to an Anchor PDP, APDP in the home network H of the mobile user.
- The mobile terminal attaches to a PEP, SPEP1, in the home network H.
- The serving PEP, SPEP1 selects a PDP, the serving PDP, SPDP1, based on some algorithm.
- The serving PDP, SPDP1, contacts the RPDF and updates it with the mapping of the address 211 of the mobile terminal on the address SPDPA1 of the serving PDP.
- The anchor PDP, APDP, contacts RPDF and retrieves the address SPDPA1 of the Serving PDP associated to the mobile terminal.
- The anchor PDP, APDP, contacts the serving PDP, SPDP1 using the address SPDPA1 of the serving PDP.

Figure 4:
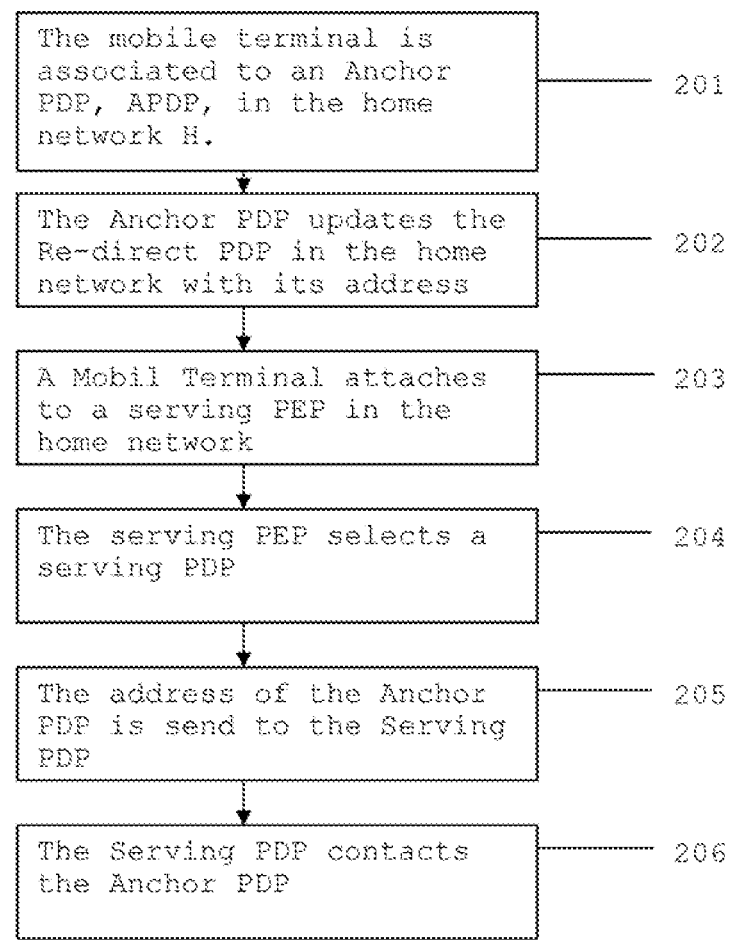

An alternative method of the second embodiment is described in FIG. 4. The RPDF is situated in the home network and the address of the mobile terminal is mapped on the address of the anchor PDP.

- The mobile terminal is associated to an Anchor PDP, APDP, in the home network H of the mobile terminal. This is illustrated in block 201 of FIG. 4.

The address 211 of the mobile terminal is mapped on the address APDPA of the anchor PDP, APDP. This information is stored in the redirect PDP function, RPDF, in the home network H. This is illustrated in block 202 of FIG. 4.

The mobile terminal 210 attaches to a serving PEP, SPEP1, in the home network H. This is illustrated in block 203 of FIG. 4.

The serving PEP, SPEP1, selects a serving PDP, SPDP1, based on same algorithm. This is illustrated in block 204 of FIG. 4.

The serving POP, SPDP1, contacts the RPDF in the home network and retrieves the address APDPA of the Anchor PDP. This is illustrated in block 205 of FIG. 4.

The serving PDP, SPDP1 contacts the Anchor PDP using the address APDPA of the anchor POP. This is illustrated in block 206 of FIG. 4.

In this case the RPDF could also be used for all kind of network elements, e.g. PEPs and Application Functions (AF), that need to know the address of a PDP associated to a Mobile Terminal. The Anchor PEP and the AF normally use some algorithm to select and find an anchor PDP. The PEP and the AF must also choose the same PDP for a specific user. This algorithm is typically stored in the PEPs and the AFs. In this case the algorithm used to select Anchor PDP and AF could be stored in one place only, in the RPDF. In an embodiment where the Anchor PDP is registered at the RDPF there is not necessary for the Anchor PDP to update the RPDF, the RPDF already has this information.

The invention claimed is:

1. A method of operating a re-direct policy decision function for policy decision point discovery for a mobile terminal roaming in an Internet protocol network, comprising:
the re-direct policy decision function storing a mapped address between an address of the mobile terminal and an address of a first policy decision point;
the re-direct policy decision function receiving a request from a second policy decision point for the mapped address; and
the re-direct policy decision function providing the mapped address to the second policy decision point wherein the second policy decision point discovers the first policy decision point associated with the mobile terminal, and wherein the first policy decision point is a serving policy decision point and the second policy decision point is an anchor policy decision point.

2. The method according to claim 1 further comprising the re-direct policy decision function providing an address of the re-direct policy decision function to the second policy decision point.

3. The method according to claim 1 further comprising the re-direct policy decision function mapping the address of the mobile terminal to the address of the first policy decision point.

4. The method according to claim 1 wherein one of the first policy decision point and the second policy decision point has access to policy rules and information about the mobile terminal.

5. The method according to claim 1 wherein one of the first policy decision point and the second policy decision point is located in a home network and another of the first policy decision point and the second policy decision point is located in a visited network.

6. A re-direct policy decision function for policy decision point discovery for a mobile terminal roaming in an Internet protocol network, comprising:
a processor; and
memory including computer program code, the memory and the computer program code configured to, with the processor, cause the communication node to perform at least the following:
store a mapped address between an address of the mobile terminal and an address of a first policy decision point;
receive a request from a second policy decision point for the mapped address; and
provide the mapped address to the second policy decision point wherein the second policy decision point discovers the first policy decision point associated with the mobile terminal, and wherein the first policy decision point is a serving policy decision point and the second policy decision point is an anchor policy decision point.

7. The re-direct policy decision function according to claim 6 wherein the memory and the computer program code are further configured to, with the processor, cause the re-direct policy decision function to provide an address of the re-direct policy decision function to the second policy decision point.

8. The re-direct policy decision function according to claim 6 wherein the memory and the computer program code are further configured to, with the processor, cause the re-direct policy decision function to map the address of the mobile terminal to the address of the first policy decision point.

9. The re-direct policy decision function according to claim 6 wherein one of the first policy decision point and the second policy decision point has access to policy rules and information about the mobile terminal.

10. The re-direct policy decision function according to claim 6 wherein one of the first policy decision point and the second policy decision point is located in a home network and another of the first policy decision point and the second policy decision point is located in a visited network.

11. A communication system operable in an Internet protocol network, comprising:
a mobile terminal;
a first policy decision point;
a second policy decision point; and
a re-direct policy decision function for policy decision point discovery for the mobile terminal roaming in the Internet protocol network, configured to:
store a mapped address between an address of the mobile terminal and an address of the first policy decision point,
receive a request from the second policy decision point for the mapped address, and
provide the mapped address to the second policy decision point wherein the second policy decision point discovers the first policy decision point associated with the mobile terminal, and wherein the first policy decision point is a serving policy decision point and the second policy decision point is an anchor policy decision point.

12. The communication system according to claim 11 wherein the re-direct policy decision function is configured to provide an address of the re-direct policy decision function to the second policy decision point.

13. The communication system according to claim 11 wherein the re-direct policy decision function is configured to map the address of the mobile terminal to the address of the first policy decision point.

14. The communication system according to claim 11 wherein one of the first policy decision point and the second policy decision point has access to policy rules and information about the mobile terminal.

15. The communication system according to claim 11 wherein one of the first policy decision point and the second policy decision point is located in a home network and another of the first policy decision point and the second policy decision point is located in a visited network.

16. A method of operating a re-direct policy decision function for policy decision point discovery for a mobile terminal roaming in an Internet protocol network, comprising:
   the re-direct policy decision function storing a mapped address between an address of the mobile terminal and an address of a first policy decision point;
   the re-direct policy decision function receiving a request from a second policy decision point for the mapped address; and
   the re-direct policy decision function providing the mapped address to the second policy decision point wherein the second policy decision point discovers the first policy decision point associated with the mobile terminal, and wherein the first policy decision point is an anchor policy decision point and the second policy decision point is a serving policy decision point.

17. The method according to claim 16 further comprising the re-direct policy decision function providing an address of the re-direct policy decision function to the second policy decision point.

18. The method according to claim 16 further comprising the re-direct policy decision function mapping the address of the mobile terminal to the address of the first policy decision point.

19. The method according to claim 16 wherein one of the first policy decision point and the second policy decision point has access to policy rules and information about the mobile terminal.

20. The method according to claim 16 wherein one of the first policy decision point and the second policy decision point is located in a home network and another of the first policy decision point and the second policy decision point is located in a visited network.

21. A re-direct policy decision function for policy decision point discovery for a mobile terminal roaming in an Internet protocol network, comprising:
   a processor; and
   memory including computer program code, the memory and the computer program code configured to, with the processor, cause the communication node to perform at least the following:
      store a mapped address between an address of the mobile terminal and an address of a first policy decision point;
      receive a request from a second policy decision point for the mapped address; and
      provide the mapped address to the second policy decision point wherein the second policy decision point discovers the first policy decision point associated with the mobile terminal, and wherein the first policy decision point is an anchor policy decision point and the second policy decision point is a serving policy decision point.

22. The re-direct policy decision function according to claim 21 wherein the memory and the computer program code are further configured to, with the processor, cause the re-direct policy decision function to provide an address of the re-direct policy decision function to the second policy decision point.

23. The re-direct policy decision function according to claim 21 wherein the memory and the computer program code are further configured to, with the processor, cause the re-direct policy decision function to map the address of the mobile terminal to the address of the first policy decision point.

24. The re-direct policy decision function according to claim 21 wherein one of the first policy decision point and the second policy decision point has access to policy rules and information about the mobile terminal.

25. The re-direct policy decision function according to claim 21 wherein one of the first policy decision point and the second policy decision point is located in a home network and another of the first policy decision point and the second policy decision point is located in a visited network.

26. A communication system operable in an Internet protocol network, comprising:
   a mobile terminal;
   a first policy decision point;
   a second policy decision point; and
   a re-direct policy decision function for policy decision point discovery for the mobile terminal roaming in the Internet protocol network, configured to:
      store a mapped address between an address of the mobile terminal and an address of the first policy decision point,
      receive a request from the second policy decision point for the mapped address, and
      provide the mapped address to the second policy decision point wherein the second policy decision point discovers the first policy decision point associated with the mobile terminal, and wherein the first policy decision point is an anchor policy decision point and the second policy decision point is a serving policy decision point.

27. The communication system according to claim 26 wherein the re-direct policy decision function is configured to provide an address of the re-direct policy decision function to the second policy decision point.

28. The communication system according to claim 26 wherein the re-direct policy decision function is configured to map the address of the mobile terminal to the address of the first policy decision point.

29. The communication system according to claim 26 wherein one of the first policy decision point and the second policy decision point has access to policy rules and information about the mobile terminal.

30. The communication system according to claim 26 wherein one of the first policy decision point and the second policy decision point is located in a home network and another of the first policy decision point and the second policy decision point is located in a visited network.

* * * * *